United States Patent
Sugiyama et al.

(10) Patent No.: US 8,027,002 B2
(45) Date of Patent: Sep. 27, 2011

(54) LIQUID CRYSTAL DISPLAY COMPRISING A BIAXIAL PLATE AND A C-PLATE

(75) Inventors: Takashi Sugiyama, Meguro-ku (JP); Yoshihisa Iwamoto, Meguro-ku (JP)

(73) Assignee: Stanley Electric Co., Ltd., Tokyo (JP)

( * ) Notice: Subject to any disclaimer, the term of this patent is extended or adjusted under 35 U.S.C. 154(b) by 1148 days.

(21) Appl. No.: 11/746,227

(22) Filed: May 9, 2007

(65) Prior Publication Data

US 2008/0030655 A1 Feb. 7, 2008

(30) Foreign Application Priority Data

May 9, 2006 (JP) ................................. 2006-129869

(51) Int. Cl.
*G02F 1/1335* (2006.01)

(52) U.S. Cl. ................... 349/117; 349/118; 349/119
(58) Field of Classification Search ........... 349/117–121
See application file for complete search history.

(56) References Cited

U.S. PATENT DOCUMENTS

| | | | | |
|---|---|---|---|---|
| 6,646,701 B2 * | 11/2003 | Lyu et al. | | 349/119 |
| 7,352,423 B2 * | 4/2008 | Lee et al. | | 349/119 |
| 7,804,565 B2 * | 9/2010 | Saitoh et al. | | 349/117 |

FOREIGN PATENT DOCUMENTS

| | | |
|---|---|---|
| JP | H07-069536 B2 | 7/1995 |
| JP | 2000-19518 A | 1/2000 |
| JP | 3027805 B2 | 1/2000 |
| JP | 3330574 B2 | 7/2002 |

* cited by examiner

*Primary Examiner* — Mark Robinson
*Assistant Examiner* — Charles Chang
(74) *Attorney, Agent, or Firm* — Chen Yoshimura LLP

(57) ABSTRACT

A vertical alignment type liquid crystal display, which has a liquid crystal layer whose retardation value is about 600 nm or more, can solve the viewing angle problems associated with the wider viewing angle. The liquid crystal display can include a vertical alignment liquid crystal cell, and first and second polarizing plates cross-Nicol disposed on respective sides of the liquid crystal cell. The liquid crystal cell has a liquid crystal layer with a retardation of about 600 nm or more. A biaxial plate is provided between the liquid crystal cell and the first polarizing plate, and two C-plates are provided between the liquid crystal cell and the second polarizing plate.

5 Claims, 8 Drawing Sheets

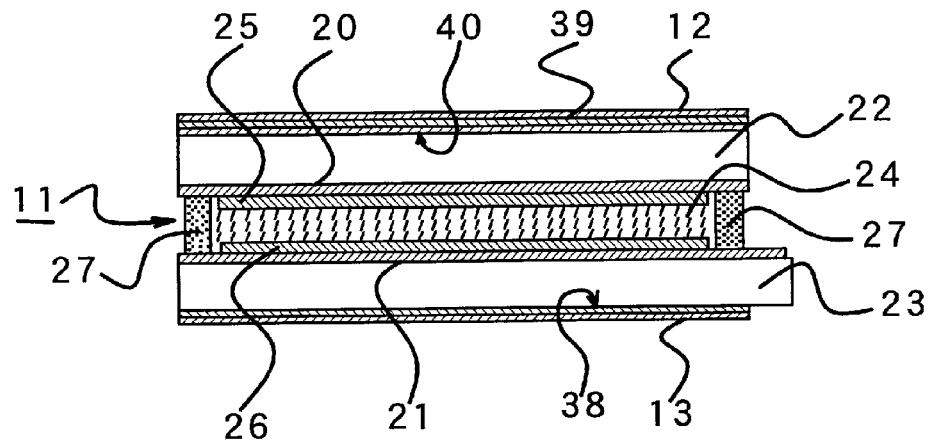
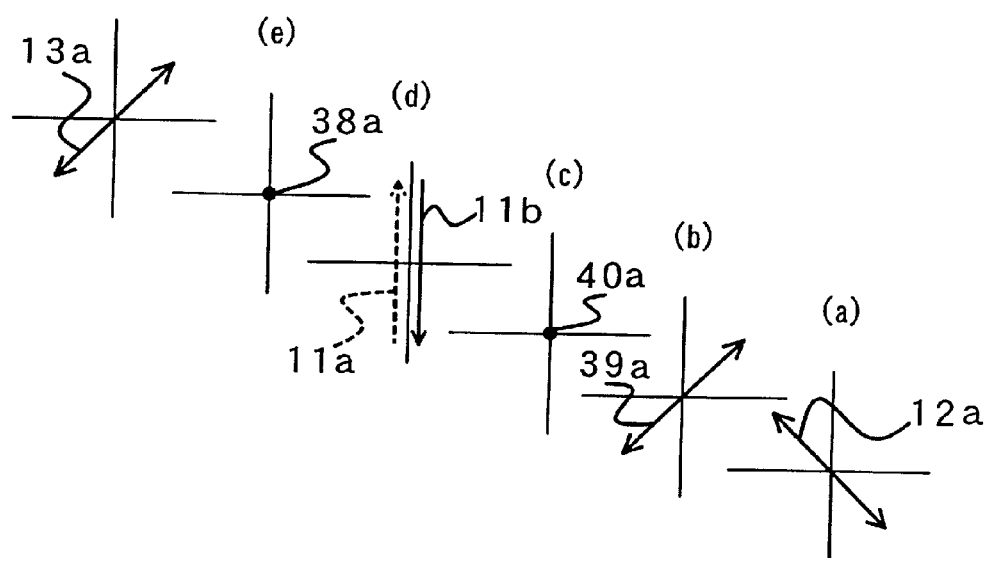

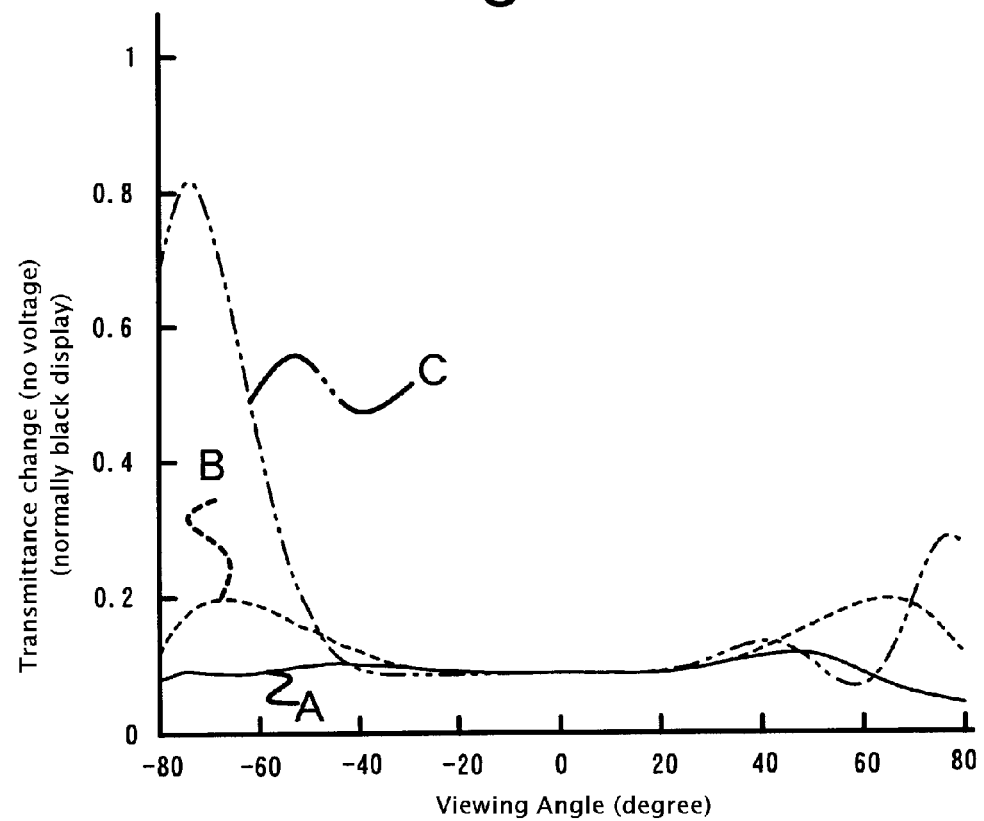

LIQUID CRYSTAL DISPLAY COMPRISING A BIAXIAL PLATE AND A C-PLATE

This application claims the priority benefit under 35 U.S.C. §119 of Japanese Patent Application No. 2006-129869 filed on May 9, 2006, which is hereby incorporated in its entirety by reference.

BACKGROUND

1. Technical Field

The disclosed subject matter relates to a liquid crystal display of a vertical alignment type. In particular, the presently disclosed subject matter relates to a liquid crystal display having a liquid crystal layer with a retardation of about 600 nm or more and an effective viewing angle compensation structure therefor.

2. Description of the Related Art

In recent years, viewing angle compensation means having a variety of optical characteristics have been proposed for vertical alignment type liquid crystal displays. In particular, examples of such viewing angle compensation means include viewing angle compensation plates.

Japanese Patent Publication No. Hei 7-69536 discloses a liquid crystal display having a vertical alignment type liquid crystal cell and first and second polarizing plates which are cross-Nicol disposed on respective sides of the liquid crystal cell. In this liquid crystal display, viewing angle compensation means is provided between the liquid crystal cell and any one of the first and second polarizing plates.

In the disclosed liquid crystal display, the viewing angle compensation means comprises a viewing angle compensation plate having three main refractive indices. In this instance, one of the main refractive indices is smaller than the other two main refractive indices, and an axis corresponding to the smallest main refractive index is parallel to the normal direction of the compensation plate.

In addition to this, the patent document discloses that it is effective to utilize a negative uniaxial compensation plate, so-called "C-plate," as a viewing angle compensation plate, which has an optical axis being parallel to the normal direction of the compensation plate. Further to this, the patent document also discloses that it is effective to utilize a biaxial compensation plate, so-called "biaxial plate," as a viewing angle compensation plate, which is a medium having biaxial optical anisotropy and which has a minimum main refractive index with its axis being parallel to the normal direction of the compensation plate.

The invention of Japanese Patent No. 3330574 includes viewing angle compensation means which is provided between the liquid crystal cell and one polarizing plate as in the previous case. This viewing angle compensation means utilize a viewing angle compensation plate, so-called "biaxial plate," which has three main refractive indices where one of the main refractive indices is smaller than the other two main refractive indices, and an axis corresponding to the smallest main refractive index is parallel to the normal direction of the compensation plate. This biaxial plate is arranged such that larger one of the other two main refractive indices, namely the delay phase axis in the in-plane direction of the viewing angle compensation plate, is substantially parallel to or perpendicular to the absorption axis of the adjacent polarizing plate. In this configuration, the patent document discloses that the retardation in an in-plane direction of 120 nm or less is advantageous.

The invention of Japanese Patent No. 3027805 includes viewing angle compensation means which is provided between the liquid crystal cell and one polarizing plate as in the previous cases. The viewing angle compensation means is composed of a so-called A-plate (which has an optical axis in an in-plane direction and is a positive uniaxial compensation plate whose refractive index anisotropy is positive) and a so-called C-plate (which has an optical axis being parallel to the normal direction of the compensation plate and is a negative uniaxial compensation plate whose refractive index anisotropy is negative). In this viewing angle compensation means, the A-plate, the C-plate, and the polarizing plate are arranged in this order from the liquid crystal cell side. In this instance, the patent document discloses that the retardation of the A-plate is advantageously set to 120 nm or less.

Japanese Patent Laid-Open Publication No. 2000-19518 discloses a vertical alignment type liquid crystal display in which liquid crystals are oriented in an axial symmetric manner in each of liquid crystal areas when a voltage is applied thereto. It is also disclosed that this liquid crystal display is advantageously provided with a biaxial plate as disclosed in Japanese Patent Publication No. Hei 7-69536 or the publication of Japanese Patent No. 3330574, or a viewing angle compensation plate prepared by stacking the A-plate and the C-plate as disclosed in Publication of Japanese Patent No. 3027805.

As shown, the inventions disclosed in the publications of Japanese Patent No. 3330574 and No. 3027805 and Japanese Patent Laid-Open Publication No. 2000-19518 have proposed the respective optical compensation plates which are configured based on the principle of the viewing angle compensation means provided to the liquid crystal display of vertical alignment type disclosed in Japanese Patent Publication No. Hei 7-69536 and are further improved by setting certain viewing angle compensation conditions.

Here, Japanese Patent Publication No. Hei 7-69536 does not specifically discuss the product of the birefringence of the liquid crystal and the cell thickness, namely, the retardation of the liquid crystal layer. In this regard, the publications of Japanese Patent No. 3330574 and No. 3027805 and Japanese Patent Laid-Open Publication No. 2000-19518 each disclose that the advantageous effect can be obtained within a certain range of retardation values. Specifically, the publications of Japanese Patent No. 3330574 and No. 3027805 disclose that the retardation value of the liquid crystal layer is advantageously in the range of from 80 nm to 400 nm. Japanese Patent Laid-Open Publication No. 2000-19518 discloses that the retardation value of the liquid crystal layer is advantageously in the range of from 300 nm to 550 nm.

Since the liquid crystal displays disclosed in the publications of Japanese Patent No. 3330574 and No. 3027805 and Japanese Patent Laid-Open Publication No. 2000-19518 are active matrix type liquid crystal displays that are typically represented by TFT-LCDs, the retardation values are specifically limited as described above. In other words, the above-referenced publications do not consider cases in which a liquid crystal layer in liquid crystal display has a larger retardation value.

SUMMARY OF THE INVENTION

In view of the above-described and other problems, it is an object of the presently disclosed subject matter to provide a viewing angle compensation technique that is suitable for a liquid crystal display having a liquid crystal layer with a high retardation of about 600 nm or more. The liquid crystal layer having such a high retardation value is not addressed in vertical alignment type liquid crystal displays disclosed in the publications of Japanese Patent No. 3330574 and No.

3027805 and Japanese Patent Laid-Open Publication No. 2000-19518. The presently disclosed subject matter can provide viewing angle compensation means to obtain a significant viewing angle improving effect.

A viewing angle compensation plate constituting the viewing angle compensation means can be prepared by stretching a norbornene-based resin material. However, the existing processing technique cannot increase the retardation in the thickness direction of the compensation plate.

The existing processing technique can manufacture biaxial plates and C-plates each having a maximum retardation value of approximately 250 nm in the thickness direction of the compensation plate when taking stable mass-production into consideration. In the case where a deterioration is allowed which is a reduction in yield within an allowable range, the existing processing technique can provide compensation plates having a maximum retardation value of approximately 270 nm.

In view of these circumstances, the publications of Japanese Patent No. 3330574 and No. 3027805 and Japanese Patent Laid-Open Publication No. 2000-19518 disclose techniques in which a viewing angle compensation plate is provided on both sides of the liquid crystal cell.

It should be noted that an appropriate viewing angle compensation plate typically has approximately the same retardation value in its thickness direction as that of the liquid crystal layer of a liquid crystal display.

When a liquid crystal display having a liquid crystal layer whose retardation value is about 600 nm or more is provided with a viewing angle compensation plate on both sides of the liquid crystal cell for optimum viewing angle compensation, the viewing angle compensation plates manufactured by the existing processing technique cannot provide sufficient retardations in the thickness direction of the plate.

In view of this problem, it is conceivable that two or more viewing angle compensation plates are stacked to be provided on both sides of the liquid crystal cell in order to increase the retardation value by summing up the respective retardation values in the thickness direction. Even if the liquid crystal display has such a configuration, when a viewer observes the liquid crystal display at viewing angles of 40 degrees or more, for example, there is a problem in which light undesirably passes through the liquid crystal display even in a normally black display area.

In view of the above-described circumstances, in one aspect, it is an object of the presently disclosed subject matter to provide a vertical alignment type liquid crystal display having a liquid crystal layer whose retardation value is 600 nm or more, the liquid crystal display being provided with a high performance viewing angle compensation component(s) which can achieve optimum viewing angle compensation and can solve the viewing angle problems associated with the wider viewing angle.

One aspect of the presently disclosed subject matter is a liquid crystal display which includes: a vertical alignment type liquid crystal cell having a liquid crystal layer containing liquid crystal molecules, a retardation of the liquid crystal layer being configured to be about 600 nm or more; a first polarizing plate and a second polarizing plate provided to respective sides of the liquid crystal cell, the first and second polarizing plates each having an absorption axis and being cross-Nicol disposed, the first and second polarizing plates being disposed such that the respective absorption axes form a predetermined angle with respect to a direction in which the liquid crystal molecules are slanted by application of a voltage greater than a threshold voltage; a simple-matrix driving system; a biaxial plate provided between the liquid crystal cell and the first polarizing plate, the biaxial plate having refractive indices nx, ny, and nz in in-plane directions and in the thickness direction, respectively, in which a relationship of nx>ny>nz is satisfied, the biaxial plate being disposed such that its delay phase axis in the in-plane direction is perpendicular to the absorption axis of the first polarizing plate; and a C-plate provided between the liquid crystal cell and the second polarizing plate, the C-plate having refractive indices nx, ny, and nz in in-plane directions and in the thickness direction, respectively, in which a relationship of nx=ny>nz is satisfied.

In this liquid crystal display in accordance with the above described aspect, the biaxial plate may have an in-plane retardation of about 100 nm or less.

Another aspect of the presently disclosed subject matter is a liquid crystal display which includes: a vertical alignment type liquid crystal cell having a liquid crystal layer containing liquid crystal molecules, a retardation of the liquid crystal layer being configured to be about 600 nm or more; a first polarizing plate and a second polarizing plate provided to respective sides of the liquid crystal cell, the first and second polarizing plates each having an absorption axis and being cross-Nicol disposed, the first and second polarizing plates being disposed such that the respective absorption axes form a predetermined angle with respect to a direction in which the liquid crystal molecules are slanted by application of a voltage greater than a threshold voltage; a simple-matrix driving system; a first C-plate and an A-plate provided between the liquid crystal cell and the first polarizing plate in this order, the A-plate having refractive indices nx, ny, and nz in in-plane directions and in the thickness direction, respectively, in which a relationship of nx>ny=nz is satisfied, the first C-plate having refractive indices nx, ny, and nz in in-plane directions and in the thickness direction, respectively, in which a relationship of nx=ny>nz is satisfied, the A-plate having its optical axis disposed such that the optical axis is perpendicular to the absorption axis of the first polarizing plate; and a second C-plate provided between the liquid crystal cell and the second polarizing plate, the second C-plate having refractive indices nx, ny, and nz in in-plane directions and in the thickness direction, respectively, in which a relationship of nx=ny>nz is satisfied.

In this liquid crystal display in accordance with the above described aspect, the A-plate may have an in-plane retardation of about 100 nm or less.

In the liquid crystal display configured as described above, the C-plate disposed between the liquid crystal cell and the second polarizing plate can be formed of two or more stacked plates.

In accordance with these aspects of the presently disclosed subject matter, even when the liquid crystal display includes a vertical alignment type liquid crystal cell having a liquid crystal layer whose retardation is about 600 nm or more, viewing angle compensation can be achieved with high accuracy. Furthermore, viewing angle compensation can be achieved highly effectively and easily implemented.

BRIEF DESCRIPTION OF THE DRAWINGS

These and other characteristics, features, and advantages of the presently disclosed subject matter will become clear from the following description with reference to the accompanying drawings, wherein:

FIG. 10 is an enlarged cross-sectional view showing a display unit of a liquid crystal display of a fourth exemplary embodiment;

FIG. 11 includes (a) through (f) optical characteristics diagrams of a liquid crystal cell, polarizing plates, an A-plate, and a C-plate, respectively, all of which constitute the display unit of FIG. 10;

FIG. 14 is a graph showing the viewing angle characteristics of liquid crystal displays made in accordance with the principles of the presently disclosed subject matter and a liquid crystal display made in accordance with the referenced technique.

DETAILED DESCRIPTION OF EXEMPLARY EMBODIMENTS

A description will now be given of exemplary embodiments that are constructed in accordance with principles of the presently disclosed subject matter with reference to the accompanying drawings.

Figure 1:
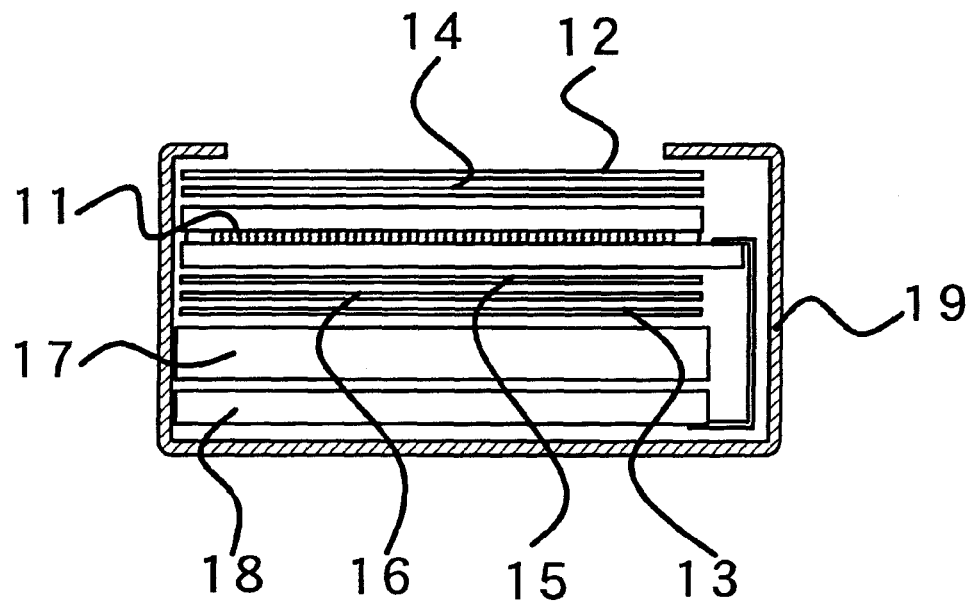
FIG. 1 is a schematic cross-sectional view showing the configuration of a liquid crystal display of a first exemplary embodiment made in accordance with principles of the disclosed subject matter.

FIG. 1 shows a schematic configuration of a liquid crystal display of a first exemplary embodiment.

This liquid crystal display can be driven based on a simple-matrix driving method using a duty ratio of 1/4 or more.

The liquid crystal display according to this embodiment includes a liquid crystal cell 11, polarizing plates 12 and 13 disposed on respective sides of the liquid crystal cell 11, a biaxial plate 14 disposed between the liquid crystal cell 11 and the polarizing plate 12, and two C-plates 15 and 16 disposed between the liquid crystal cell 11 and the polarizing plate 13.

In addition to this, the liquid crystal display can include a backlight unit 17, a drive circuit board 18, and the like. The components can be enclosed by a resin cover 19, for example, to constitute a display unit for the liquid crystal display.

It should be noted that hereinafter the side where the backlight unit 17 is provided is a rear side and the side where the polarizing plate 12 is provided is a front side.

Figure 2:
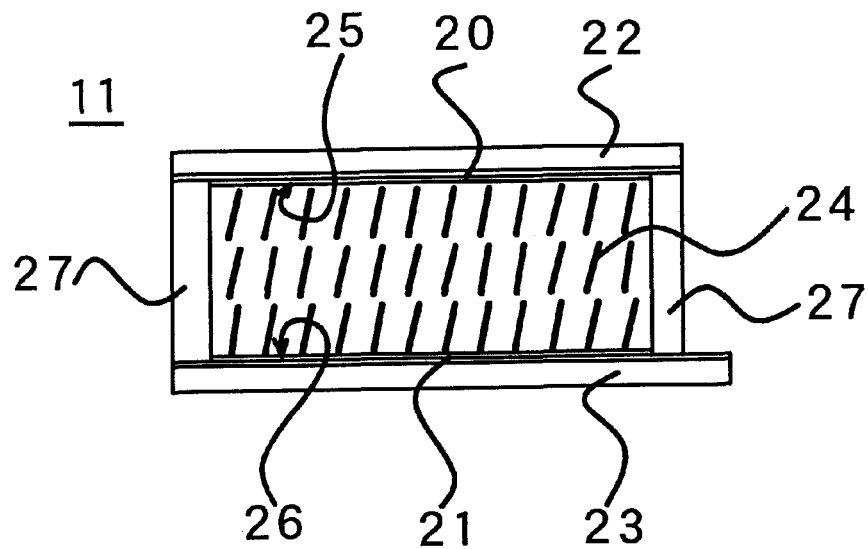
FIG. 2 is a simplified cross-sectional view of a liquid crystal cell of the liquid crystal display of the first exemplary embodiment shown in FIG. 1.

FIG. 2 is a schematic cross-sectional view of the liquid crystal cell 11 described above.

The liquid crystal cell 11 can include transparent substrates 22 and 23 made of a glass substrate, for example, a pair of transparent electrodes 20 and 21 formed thereon, and liquid crystal 24 interposed therebetween.

It should be appreciated that the drive circuit board 18, and the pair of transparent electrodes 20 and 21, and the like can constitute the simple-matrix driving system.

Orientation films 25 and 26 are formed on the respective opposed surfaces of the transparent electrodes 20 and 21.

Figure 3:
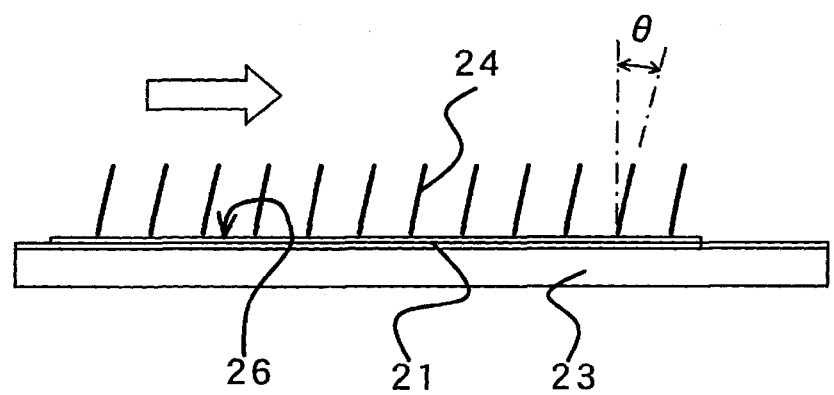
FIG. 3 is a partial enlarged cross-sectional view of the liquid crystal cell, showing the rubbing direction.

It should be appreciated that the liquid crystal cell 11 is configured as a vertical alignment type liquid crystal cell in the present exemplary embodiment. The orientation films 25 and 26 can be prepared using a vertical alignment film SE-1211 manufactured by Nissan Chemical Industries, Ltd., and by rubbing the film in the arrow direction of FIG. 3 by means of rayon rubbing cloth in order to impart a pre-tilt angle to the liquid crystal 24 molecules.

The transparent substrates 22 and 23 can be overlapped with each other via not-shown gap control materials with a diameter of 5 μm. Liquid crystal manufactured by Merck Ltd. can be used as the liquid crystal 24, which has a birefringence Δn of 0.16 and negative dielectric anisotropy (when applying a voltage, the liquid crystal molecules are slanted from a vertical direction).

Therefore, the liquid crystal layer configured in this example has a retardation of 800 nm.

The liquid crystal 24 can be sealed within the gap between the transparent substrates 22 and 23 by adhering a sealing material 27 around the transparent electrodes 20 and 21.

Figure 4:
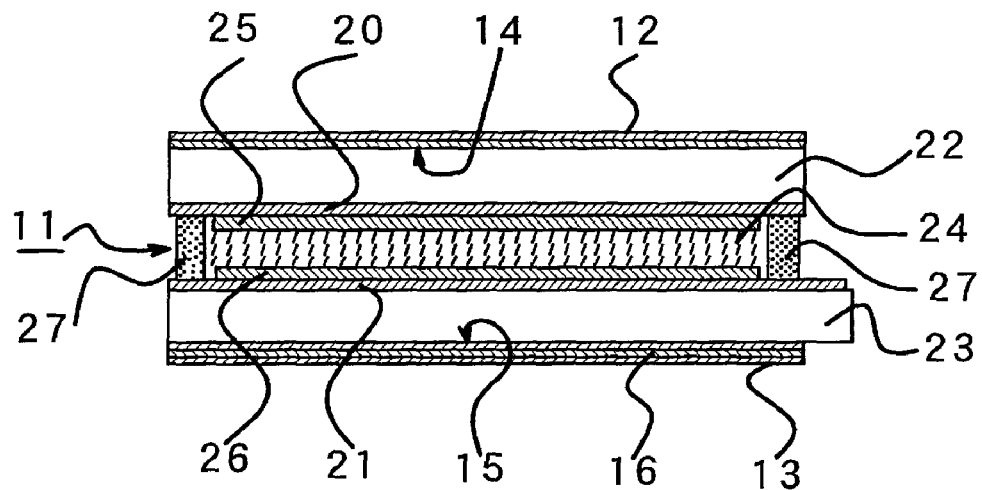
FIG. 4 is an enlarged cross-sectional view showing a display unit of the liquid crystal display of the first exemplary embodiment.

FIG. 4 shows a cross-sectional view of the display unit including the liquid crystal cell 11, the polarizing plates 12 and 13, the biaxial plate 14, and the C-plates 15 and 16. As shown in the drawing, the polarizing plate 12 is attached to the front side of the liquid crystal cell 11 with the biaxial plate 14 interposed therebetween. The polarizing plate 13 is attached to the rear side of the liquid crystal cell 11 with the two C-plates 15 and 16 interposed therebetween.

The polarizing plates 12 and 13 are cross-Nicol disposed as an uppermost layer and an undermost layer of the display unit such that their absorption axes each forms 45 degrees with the direction in which the liquid crystal molecules are slanted by rubbing.

In this instance, the term "cross-Nicol" shall mean that the absorption axes of the polarizing plates 12 and 13 cross at 90 degrees. It should be appreciated, however, that the term "cross-Nicol" includes the case where they cross at approximately 90 degrees ±several degrees depending on actual adjustments.

In the present exemplary embodiment, the biaxial plate 14 can be a phase difference plate having characteristics in which refractive indices nx, ny, and nz of the biaxial plate in in-plane directions and in the thickness direction, respectively, satisfy a relationship of nx>ny>nz. For example, this biaxial plate 14 may have a retardation in the in-plane directions of 50 nm and a retardation in the thickness direction of 240 nm, and is disposed such that its delay phase axis in the in-plane direction is perpendicular to the absorption axis of the adjacent polarizing plate 12 at the front side.

In the present exemplary embodiment, the C-plates 15 and 16 each can be a phase difference plate having characteristics in which refractive indices nx, ny, and nz of the C-plate in in-plane directions and in the thickness direction, respectively, satisfy a relationship of nx=ny>nz. The C-plates 15 and 16 each have a retardation of 220 nm and are stacked together.

Figure 5:
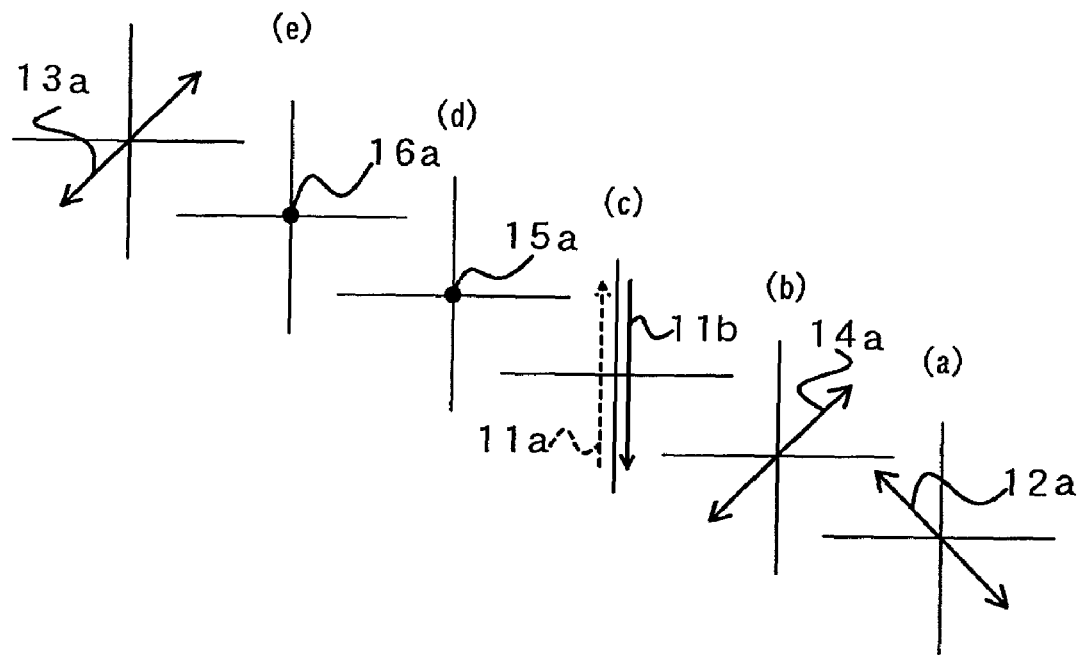
FIG. 5 includes (a) through (f) optical characteristics diagrams of a liquid crystal cell, polarizing plates, a biaxial plate, and C-plates, respectively, all of which constitute the display unit of FIG. 4.

FIG. 5 includes (a) through (f) optical characteristics diagrams of the liquid crystal cell 11, the polarizing plates 12 and 13, the biaxial plate 14, and the C-plates 15 and 16, respectively. FIG. 5(a) shows the absorption axis 12a of the front side polarizing plate 12, FIG. 5(b) shows the delay phase axis 14a in the in-plane direction of the biaxial plate 14, and FIG. 5(c) shows rubbing directions performed on the liquid crystal cell 11, specifically, in which a dotted arrow 11a is the rubbing direction performed on the front side substrate, and a solid arrow 11b is the rubbing direction performed on the rear side substrate. In addition to this, FIGS. 5(d) and 5(e) show the optical axes 15a and 16a of the respective C-plates 15 and 16, respectively (note that the optical axes are in the normal direction with respect to the surface), and FIG. 5(f) shows the absorption axis 13a of the rear side polarizing plate 13.

Figure 6:
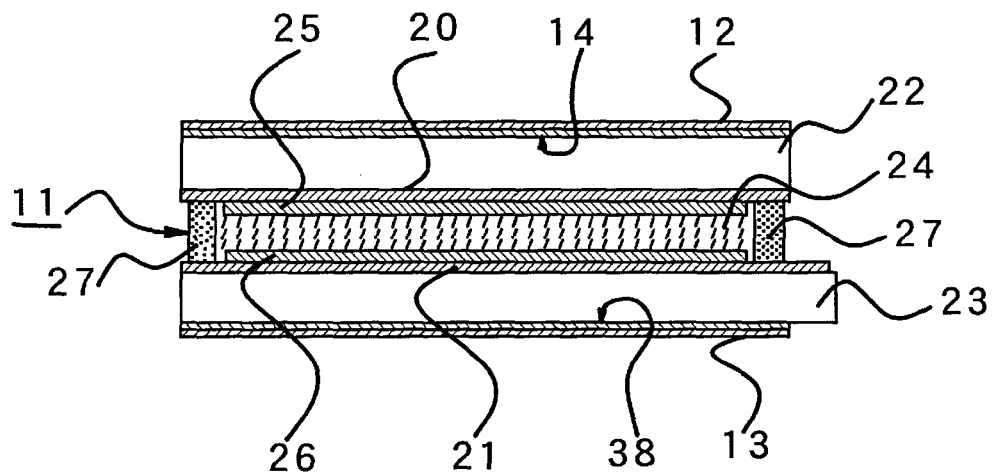
FIG. 6 is an enlarged cross-sectional view showing a display unit of a liquid crystal display of a second exemplary embodiment.
Figure 7:
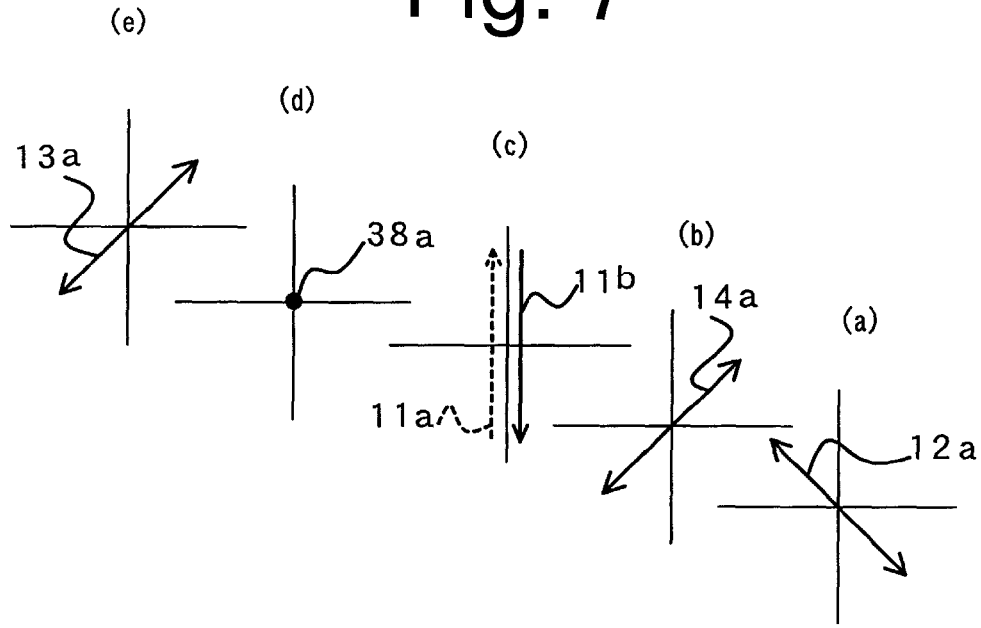
FIG. 7 includes (a) through (e) optical characteristics diagrams of a liquid crystal cell, polarizing plates, a biaxial plate, and an optical plate, respectively, all of which constitute the display unit of FIG. 6.

A description will now be given of a second exemplary embodiment. FIG. 6 shows a cross-sectional view of a display unit of the second exemplary embodiment. FIG. 7 shows the optical characteristics diagrams of a liquid crystal cell 11, polarizing plates 12 and 13, a biaxial plate 14, and an optical plate 38, respectively.

In the second exemplary embodiment the C-plates of the first exemplary embodiment are replaced with an optical plate 38. The optical plate 38 is disposed between the liquid crystal cell 11 and the rear side polarizing plate 13. The optical plate 38 can be composed of a cholesteric liquid crystal polymer having a twisted pitch shorter than the wavelength of visible light.

It is known that the optical plate 38 having the above described configuration has the similar optical function to the C-plate. Therefore, the birefringence of cholesteric liquid crystal and the thickness of the liquid crystal layer can be controlled to provide a plate having a large retardation, which cannot be achieved by the prior art technique in which, for example, a norbornene-based resin material is stretched.

In the present exemplary embodiment, the optical plate 38 is composed of the cholesteric liquid crystal polymer having a retardation of 440 nm, which is equal to the sum of the retardations of two C-plates used in the first exemplary embodiment. This configuration can provide the same or substantially same effects as that of the first exemplary embodiment in terms of its optical properties.

It should be noted that as shown in FIG. 7(d) the optical axis 38a of the optical plate 38 is in the normal direction with respect to the surface.

Figure 8:
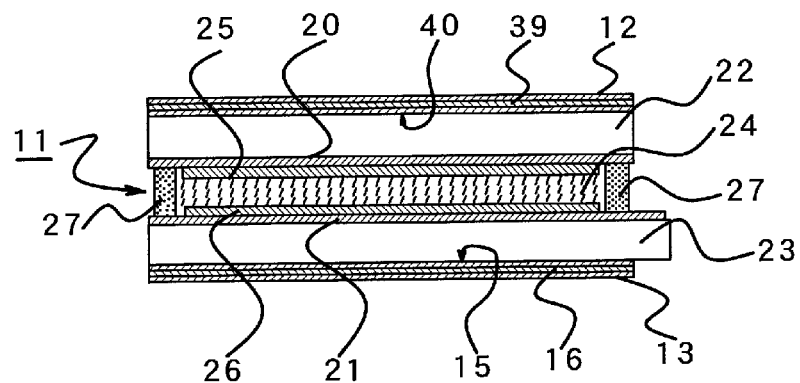
FIG. 8 is an enlarged cross-sectional view showing a display unit of a liquid crystal display of a third exemplary embodiment.

A description will now be given of a third exemplary embodiment. FIG. 8 shows a cross-sectional view of a display unit of the third exemplary embodiment.

The present exemplary embodiment is the same as the first exemplary embodiment except that the biaxial plate is replaced with an A-plate 39 and a C-plate 40 between the liquid crystal cell 11 and the front side polarizing plate 12.

In the present exemplary embodiment, the A-plate 39 can be a phase difference plate having characteristics in which refractive indices nx, ny, and nz of the A-plate in in-plane directions and in the thickness direction, respectively, satisfy a relationship of nx>ny=nz. In this example, this A-plate 39 has a retardation of 70 nm.

In addition to this, the C-plate 40 has a retardation of 200 nm.

Accordingly, this configuration can provide the same or substantially same effects as that of the first exemplary embodiment in terms of its optical properties.

Figure 9:
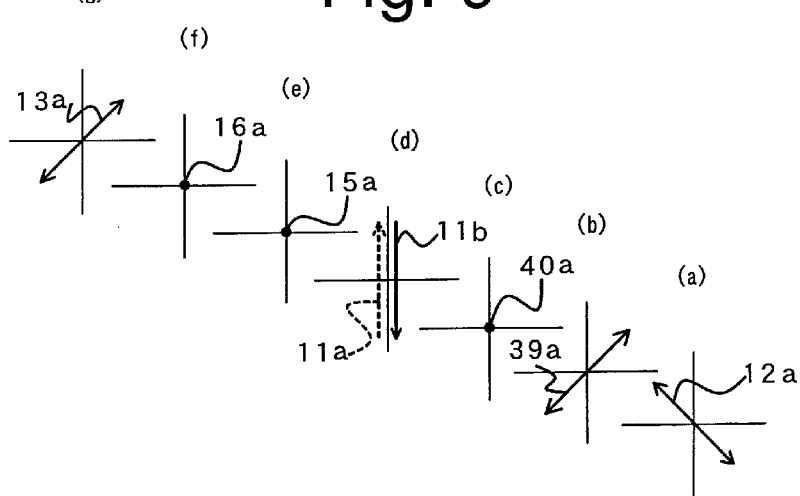
FIG. 9 includes (a) through (g) optical characteristics diagrams of a liquid crystal cell, polarizing plates, an A-plate, and a C-plate, respectively, all of which constitute the display unit of FIG. 8.

FIG. 9 includes (a) through (g) optical characteristics diagrams of the liquid crystal cell 11, the polarizing plates 12 and 13, the A-plate 39, and the C-plates 40, 15, and 16, respectively. Specifically, FIG. 9(b) shows an optical axis 39a of the A-plate 39, and FIG. 9(c) shows an optical axis 40a of the C-plate 40 (note that the optical axis is in the normal direction with respect to the surface).

A description will now be given of a fourth exemplary embodiment. FIG. 10 shows a cross-sectional view of a display unit of the fourth exemplary embodiment.

In the fourth exemplary embodiment the C-plates 15 and 16 of the third exemplary embodiment are replaced with an optical plate 38 which is described above in connection with the second exemplary embodiment. This configuration can provide the same or substantially same effects as that of the third exemplary embodiment in terms of its optical properties.

FIG. 11 includes (a) through (f) optical characteristics diagrams of the liquid crystal cell 11, the polarizing plates 12 and 13, the optical plate 38, the A-plate 39, and the C-plates 40, respectively.

Figure 12:
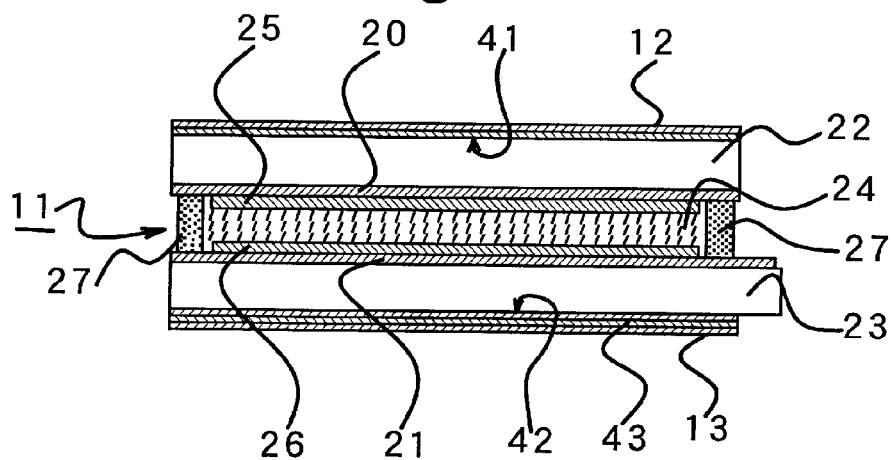
FIG. 12 is an enlarged cross-sectional view showing a display unit of a liquid crystal display of a reference example.

FIG. 12 shows a cross-sectional view of a display unit of a reference example. This reference example is made in accordance with the technique of the publication of Japanese Patent No. 3330574, and uses only biaxial plates as viewing angle compensation means.

It should be noted that because there is a limit to increasing the retardation value in the thickness direction through stretching a norbornene-based resin material, this reference configuration uses three biaxial plates 41, 42, and 43.

As shown in FIG. 12, the biaxial plate 41 is disposed between the liquid crystal cell 11 having a retardation of 800 nm and the front side polarizing plate 12.

This biaxial plate 41 is configured to have a retardation in the in-plane direction of 50 nm and a retardation in the thickness direction of 200 nm, and is disposed such that the delay phase axis thereof in the in-plane direction is perpendicular to the absorption axis of the front side polarizing plate 12.

In addition to this, two biaxial plates 42 and 43 are disposed between the liquid crystal cell 11 and the rear side polarizing plate 13. The biaxial plates 42 and 43 each have a retardation in the in-plane direction of 25 nm and a retardation in the thickness direction of 200 nm. Furthermore, the biaxial plates 42 and 43 are configured to have respective delay phase axes in the in-plane direction so that they are parallel to each other and are perpendicular to the absorption axis of the adjacent rear side polarizing plate 13.

Figure 13:
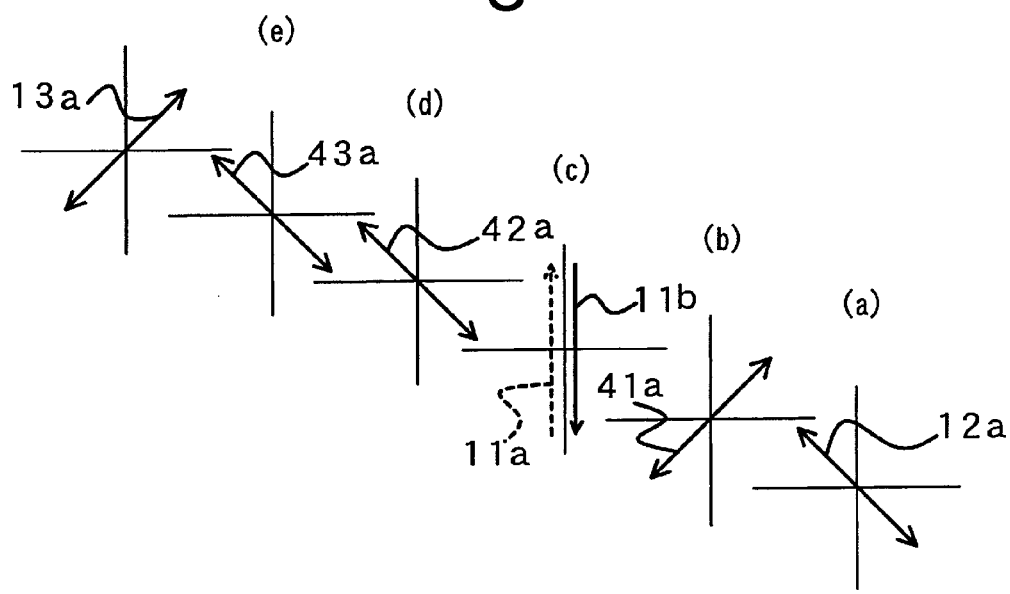
FIG. 13 includes (a) through (f) optical characteristics diagrams of a liquid crystal cell, polarizing plates, and biaxial plates, respectively, all of which constitute the display unit of FIG. 12.

FIG. 13 includes (a) through (f) optical characteristics diagrams of the liquid crystal cell 11, the polarizing plates 12 and 13, and the biaxial plates 41, 42, and 43, respectively. Specifically, FIGS. 13(b), 13(d) and 13(e) show delay phase axes 41a, 42a, and 43a of the respective biaxial plates 41, 42, and 43, respectively.

A description will now be given of the effects of the presently disclosed subject matter. FIG. 14 is a graph showing the viewing angle characteristics of liquid crystal displays made in accordance with the principles of the presently disclosed subject matter and a liquid crystal display made in accordance with the reference technique described above. This graph shows the change in transmittance when no voltage is applied to the liquid crystal display (normally black display) when the viewing angle is changed towards −90 degrees and +90 degrees in the left and right directions of the liquid crystal display with respect to zero (0) degree, which is the direction towards which the liquid crystal molecules are oriented during the application of voltage (in other words, when the normal direction is defined as 12-o'clock direction in a clock, the viewing angle is changed towards 9-o'clock direction and 3-o'clock direction).

In this graph, the curve A represents the viewing angle characteristics of the liquid crystal display of the first exemplary embodiment (shown in FIGS. 4 and 5) and the curve B represents the viewing angle characteristics of the liquid crystal display of the third exemplary embodiment (shown in FIGS. 8 and 9). The curve C represents the viewing angle characteristics of the liquid crystal display of the reference example (shown in FIGS. 12 and 13).

As understood from the curve C of the viewing angle characteristics, even though the retardation values in the in-plane direction and the thickness direction have been optimized, the transmittance increases when the viewing angle is changed to 40 degrees or more in the right and left directions. Therefore, in this reference example, light passes through the liquid crystal display even in a normally black display area, which is undesirable. Although the change value in transmittance is not so large, the change will be reflected on readily recognizable color tone changes in actual cases. In addition to this, the reference example shows the asymmetric viewing angle characteristics as can be seen from the diagram. In particular, when the viewing angle is changed towards −90 degrees (towards 9-o'clock direction), a significant change in transmittance occurred.

In contrast, the liquid crystal displays made in accordance with the principles of the presently disclosed subject matter can show a low transmittance even at the deeper viewing angles with excellent symmetry as can be seen from the curves A and B.

As described above, various exemplary embodiments of the disclosed subject matter have been described. In these exemplary embodiments, the retardation values of the respective compensation plates are configured to provide excellent viewing angle characteristics when using a vertical alignment type liquid crystal cell having a retardation of about 600 nm or more.

In the described exemplary embodiments, monodomain LCDs using rubbing technique are exemplified. The disclosed subject matter is not limited thereto, and is applicable to multidomain LCDs because the presently disclosed subject matter relates to an optical characteristic when no voltage is applied.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a vertical alignment type liquid crystal cell having a liquid crystal layer containing liquid crystal molecules, a retardation of the liquid crystal layer being configured to be about 600 nm or more;
a first polarizing plate and a second polarizing plate provided to respective sides of the liquid crystal cell, the first and second polarizing plates each having an absorption axis and being cross-Nicol disposed, the first and second polarizing plates being disposed such that the respective absorption axes form an angle of 45 degrees ±several degrees with respect to a direction in which the liquid crystal molecules are slanted by application of a voltage greater than a threshold voltage;
a biaxial plate provided between the liquid crystal cell and the first polarizing plate, the biaxial plate being directly optically coupled to the liquid crystal cell and the first polarizing plate, respectively, the biaxial plate having refractive indices nx, ny, and nz in in-plane directions and in a thickness direction, respectively, in which a relationship of nx>ny>nz is satisfied, the biaxial plate being disposed such that its delay phase axis in the in-plane direction is substantially perpendicular to the absorption axis of the first polarizing plate; and
a C-plate provided between the liquid crystal cell and the second polarizing plate, the C-plate being directly optically coupled to the liquid crystal cell and the second polarizing plate, respectively, the C-plate having refractive indices nx, ny, and nz in in-plane directions and in a thickness direction, respectively, in which a relationship of nx=ny>nz is satisfied.

2. The liquid crystal display according to claim 1, wherein the biaxial plate has a retardation in the in-plane direction of about 100 nm or less.

3. The liquid crystal display according to claim 1, wherein the C-plate disposed between the liquid crystal cell and the second polarizing plate is formed of two or more stacked C-plates.

4. The liquid crystal display according to claim 2, wherein the C-plate disposed between the liquid crystal cell and the second polarizing plate is formed of two or more stacked C-plates.

5. The liquid crystal display according to claim 1, wherein the C-plate disposed between the liquid crystal cell and the second polarizing plate is formed of a cholesteric liquid crystal polymer.

* * * * *